United States Patent [19]

Street

[11] 4,382,200

[45] May 3, 1983

[54] STIRRER MOTOR SUPPORT

[76] Inventor: Lawrence M. Street, c/o
Hy-Per-Graph Ltd., Parkfield Mills,
Fountain St., Morley, West
Yorkshire, England

[21] Appl. No.: 253,955

[22] Filed: Apr. 10, 1981

[51] Int. Cl.³ ............................................. H02K 5/00
[52] U.S. Cl. ...................................... 310/157; 310/89;
310/91
[58] Field of Search ...................... 310/89, 157, 91, 50

[56] References Cited
U.S. PATENT DOCUMENTS

| 1,915,845 | 6/1933 | Arner | 310/157 X |
| 3,676,723 | 7/1972 | Drucker | 310/157 X |
| 3,745,387 | 7/1973 | Sydnor, Jr. et al. | 310/157 X |

Primary Examiner—Donovan F. Duggan
Attorney, Agent, or Firm—David A. Jackson; Daniel H. Bobis

[57] ABSTRACT

A stirrer motor, for a flask having a neck through which a drive shaft extends from the motor to an agitating device in the flask, is arranged to be supported by means located in the neck.

9 Claims, 2 Drawing Figures

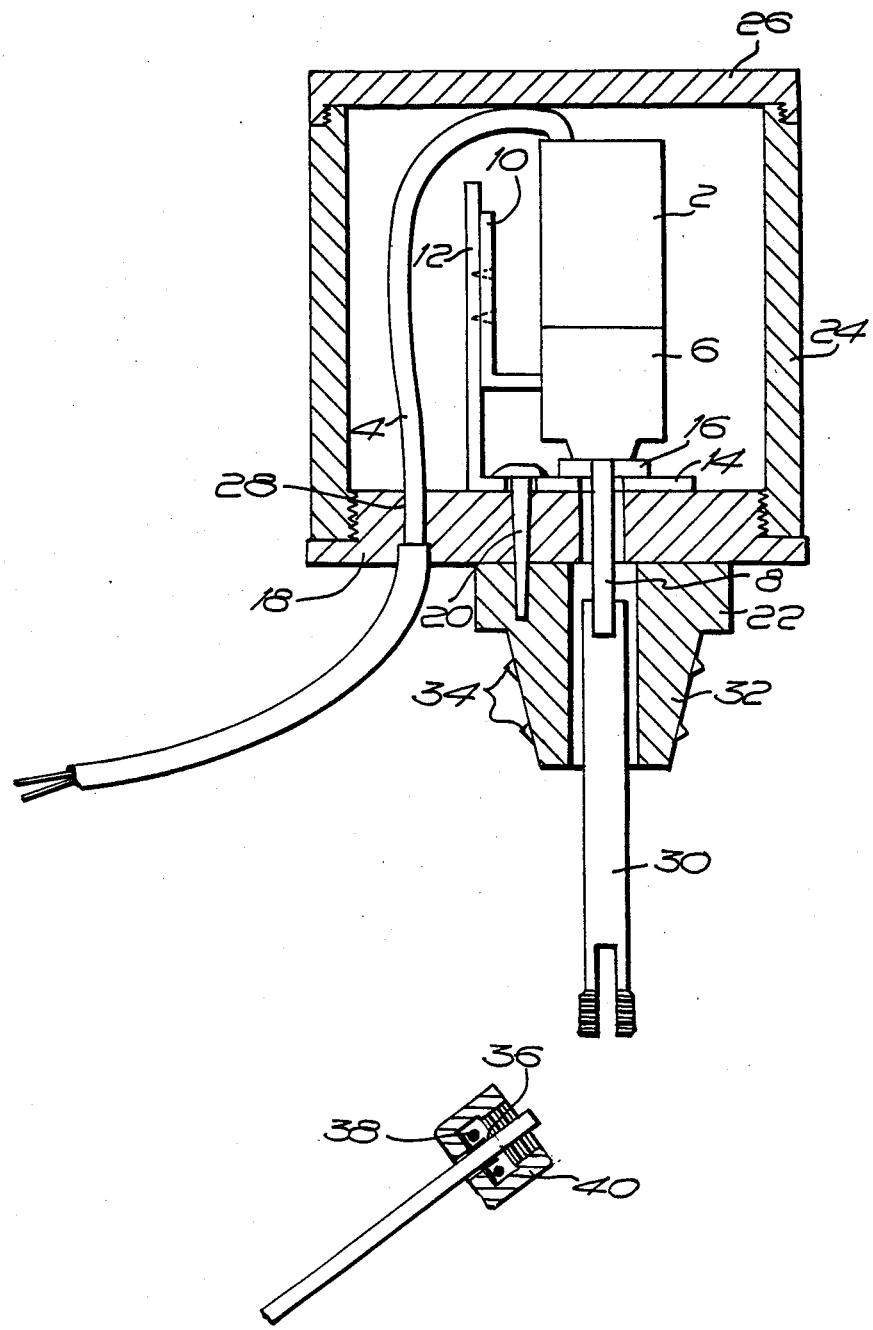

STIRRER MOTOR SUPPORT

The invention relates to means for mounting a stirrer motor and for a stirrer motor mounted by such means.

It is a well-known laboratory technique to employ a stirrer motor, commonly electric, to drive a paddle or other agitating means in liquid contained in a vessel, commonly closed, such as a flask having one or more necks via a drive shaft passing through the neck or one of the necks of the flask, the stirrer motor being supported outside the flask by means of a retort stand. However, the required precise location of the motor relative to the flask is tedious to achieve and it is an object of the invention to obviate this disadvantage.

According to the invention there is provided mounting means for a stirrer motor for driving agitating means in a flask or the like container having a neck by drive means passing through the neck, said mounting means comprising support means releasably supportable by the said neck. Preferably the support means are for support in, and may also sealingly close, said neck.

Embodiments of the invention will now be described by way of example and with reference to the accompanying drawings of which the single FIGURE shows in vertical section a stirrer motor mounted by the neck of a flask the contents of which are to be stirred.

In the FIGURE, stirrer motor 2 is a 6-volt DC reversing motor supplied with electric current by cable 4 and provided with a reducing gearbox 6 having an output shaft 8.

The motor mounting 10 is secured to a brass angled bracket 12 of limb 14 perpendicular to the motor axis is provided with an aperture for the shaft 8 and a sealing washer 16 is located about the shaft 8 between the gearbox and the bracket portion 14.

Bracket 12 is mounted on a flanged disc 18 of p.t.f.e. by means of bolts 20 (1 only shown) passing through the disc and entering tapped holes in a p.t.f.e. lower member 22.

The motor, gearbox, bracket and cable are enclosed within a cylindrical p.t.f.e. cover 24 which is threaded for engagement with disc 18 and at the other end for screw engagement with circular lid 26. The disc 18 is provided with a hole 28 for the emergence of cable 4, the hole being a tight fit about the cable.

The lower portion 22 which is bored to accommodate extension shaft 30 terminates in a frustoconical portion 32 of which the taper is according to an appropriate British standard for stoppers for flasks of the type with which the stirrer is intended to be used. The member 32 is also provided with sealing rings 34 whereby the portion 32 may be sealingly engaged in the neck of a flask.

Also shown in the FIGURE but not being part of the invention is a glass stirrer rod of conventional type which terminates in a paddle or other agitating means not shown. The upper end of the stirrer rod is provided with a p.t.f.e. collar 36 which supports a rubber O-ring 38 by means of which the rod can be sealingly engaged to the lower end of plastic extension shaft 30 by means of screwed collar 40.

As shown, the shafts 8 and 30 whilst being symmetrical with respect to portion 32 of lower body 22, are asymmetrical with respect to disc 18 and the motor cover provided by cylinder 24 and lid 20 so that appropriate orientation of the apparatus in the neck of a flask the motor housing can be accommodated where it is less likely to interfere with other parts of the apparatus.

If the stirrer motor is to be used with a flask having a neck for which the portion 32 is not an appropriate fit, an adaptor may be provided comprising an elongate hollow stem having a lower external surface appropriate to the flask and an upper internal surface appropriate to the body 32.

With the unit described mounted with the portion 32 acting as a stopper seated directly in the neck of a flask or seated in the neck of an adaptor which in turn seats in the neck of the flask, with the shafts 8 and 30 passing through the stopper, the flask and stirrer constitute an integral body. Thus the flask can be moved without disturbing the relative position of the flask and stirrer. Provided that the flask itself is satisfactorily supported, for example by means of a retort stand or in a heating mantle, the stirrer motor does not require any outside support.

In other embodiments a 12-volt motor may be employed and different materials of construction may be used. Thus the parts made of polytetrafluoroethylene (p.t.f.e.) in the first mentioned embodiment may be made of other plastics material such as nylon.

I claim:

1. A support assembly for direct, detachable mounting of a stirrer motor upon the necked opening of a vessel for driving engagement with an agitating means in said vessel, said support assembly comprising:
   A. housing means for supporting said stirrer motor;
   B. an opening in said housing means to receive the driving shaft of said stirrer motor;
   C. tapering attachment means for removably mounting in the necked opening of said vessel, said attachment means having a bore therethrough and connected with said housing means on the outer surface thereof and positioned on said housing means so that said bore and said opening are in axial alignment;
   D. said attachment means providing sole support for said housing means and said stirrer motor upon said vessel.

2. The support assembly of claim 1 wherein said attachment means is adapted to sealingly engage said necked opening to prevent liquid egress therefrom.

3. The support assembly of claim 1 wherein said attachment means defines a conical outer surface tapering downwardly and away from said housing means for engagement in and support by the necked opening of said vessel.

4. The support assembly of claim 3 wherein said attachment means includes at least one sealing ring extending from said conical outer surface for sealing engagement between said attachment means and said necked opening.

5. The support assembly of claim 1 wherein said housing means comprises a disc-like base having a circular, partially threaded perimeter, a cylindrical cover having a first internally threaded end adapted to engage said cylindrical base and a second externally threaded end, and a circular lid having an axially protruding rim along the perimeter thereof, said rim defining internal threads adapted to threadedly engage the external threaded end of said cylindrical cover.

6. The support assembly of claim 5 wherein said housing means includes a motor support bracket for receiving and steadying said stirrer motor, said support bracket is mounted upon said base, and includes a bracket bore to permit the passage therethrough of the driving shaft of said stirrer motor, and said bracket bore is disposed in axial alignment with the opening in said housing means.

7. The support assembly of either of claims 1 or 6 including fastening means retaining said attachment means and said housing means in connection with each other.

8. The support assembly of claim 1 wherein said attachment means is integral with said housing means.

9. The support assembly of claim 5 wherein said opening is located eccentrically with respect to the perimeter of said base.

* * * * *